US 7,394,234 B2

(12) United States Patent
Kodera

(10) Patent No.: US 7,394,234 B2
(45) Date of Patent: *Jul. 1, 2008

(54) POWER SUPPLY CIRCUIT AND TEST APPARATUS

(75) Inventor: Satoshi Kodera, Tokyo (JP)

(73) Assignee: Advantest Corporation, Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 11/387,167

(22) Filed: Mar. 23, 2006

(65) Prior Publication Data

US 2006/0255784 A1 Nov. 16, 2006

(30) Foreign Application Priority Data

Mar. 23, 2005 (JP) ............................. 2005-083581

(51) Int. Cl.
*G05F 1/00* (2006.01)

(52) U.S. Cl. ..................... 323/282; 323/284; 323/285; 323/351; 363/63; 324/763

(58) Field of Classification Search ................ 324/763, 324/750–755; 323/282–285, 351; 363/63
See application file for complete search history.

(56) References Cited

U.S. PATENT DOCUMENTS 5,461,557 A * 10/1995 Tamagawa ................... 363/60

6,903,950 B2 * 6/2005 Afzal et al. ................. 363/142

OTHER PUBLICATIONS

Takamasa Hori, Inter-University Power Electronics, First Edition, Ohmsha Ltd., Dec. 1996, pp. 85-102.

* cited by examiner

*Primary Examiner*—Jessica Han
*Assistant Examiner*—Emily Pham
(74) *Attorney, Agent, or Firm*—Osha Liang LLP

(57) ABSTRACT

A power-supply circuit for supplying voltage to a load while freely selecting positive voltage and negative voltage using a single power supply has a power supply that generates power-supply voltage, an inverted outputting circuit having a positive voltage terminal for outputting positive voltage based on the power-supply voltage and a negative voltage terminal for outputting negative voltage generated based on the power-supply voltage and having different polarity from the positive voltage and outputting the positive and negative voltage while keeping the same direction in terms of directions of electric current flowing between the positive voltage terminal and the outside and of electric current flowing between the negative voltage terminal and the outside and a step-down output circuit for supplying predetermined voltage to the load by connecting the positive voltage terminal and the negative voltage terminal to the load while switching them with a predetermined duty ratio.

15 Claims, 7 Drawing Sheets

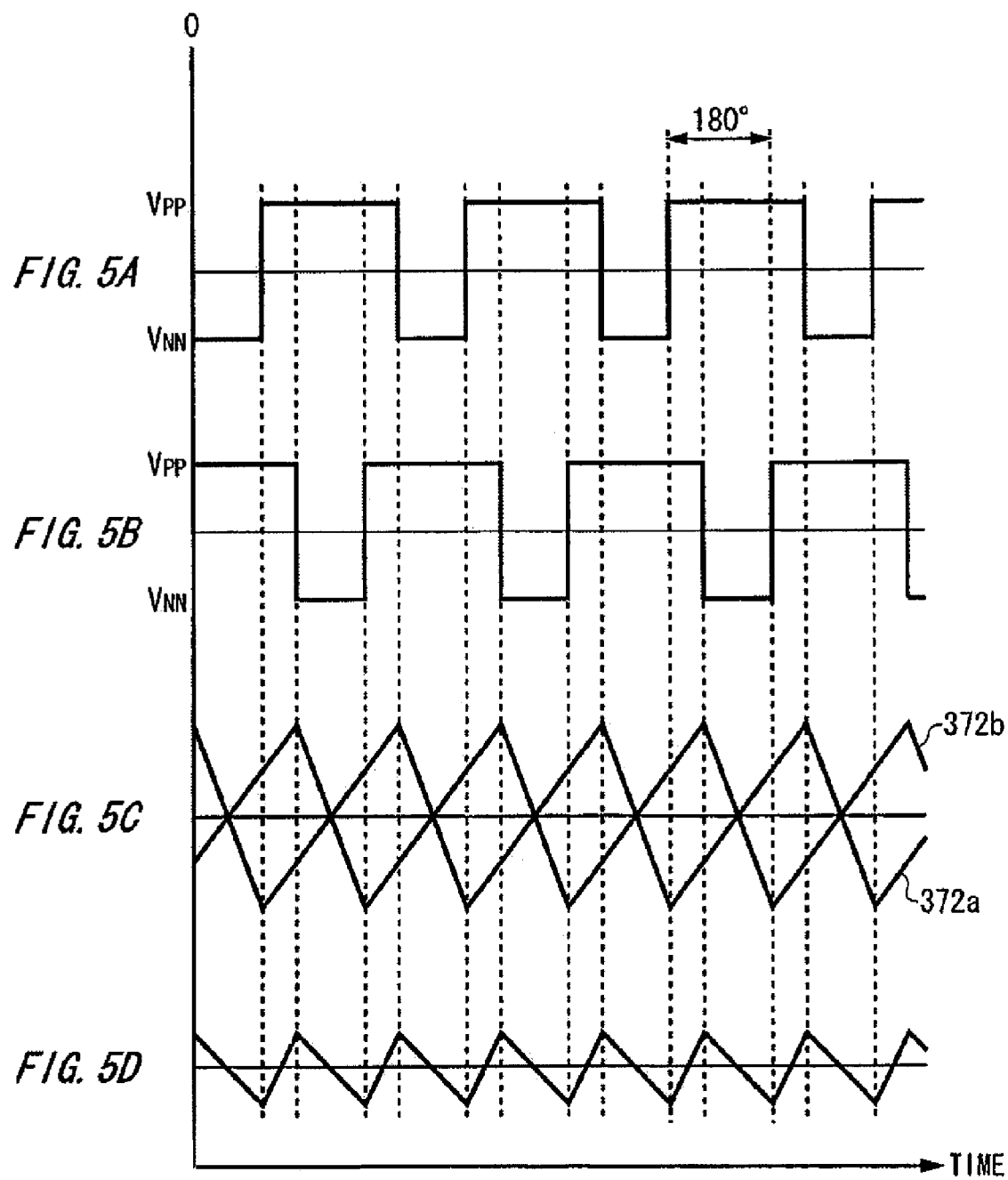

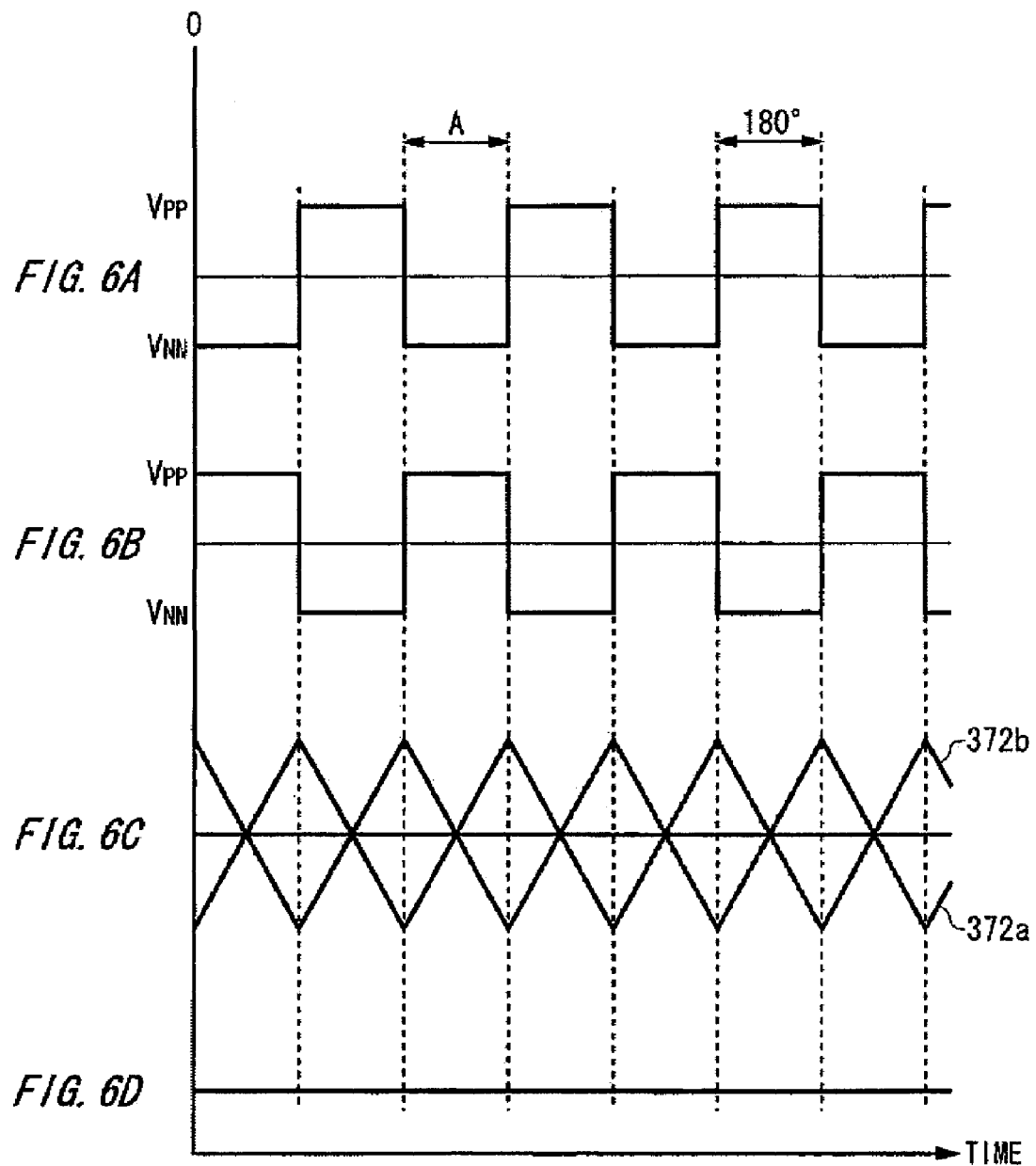

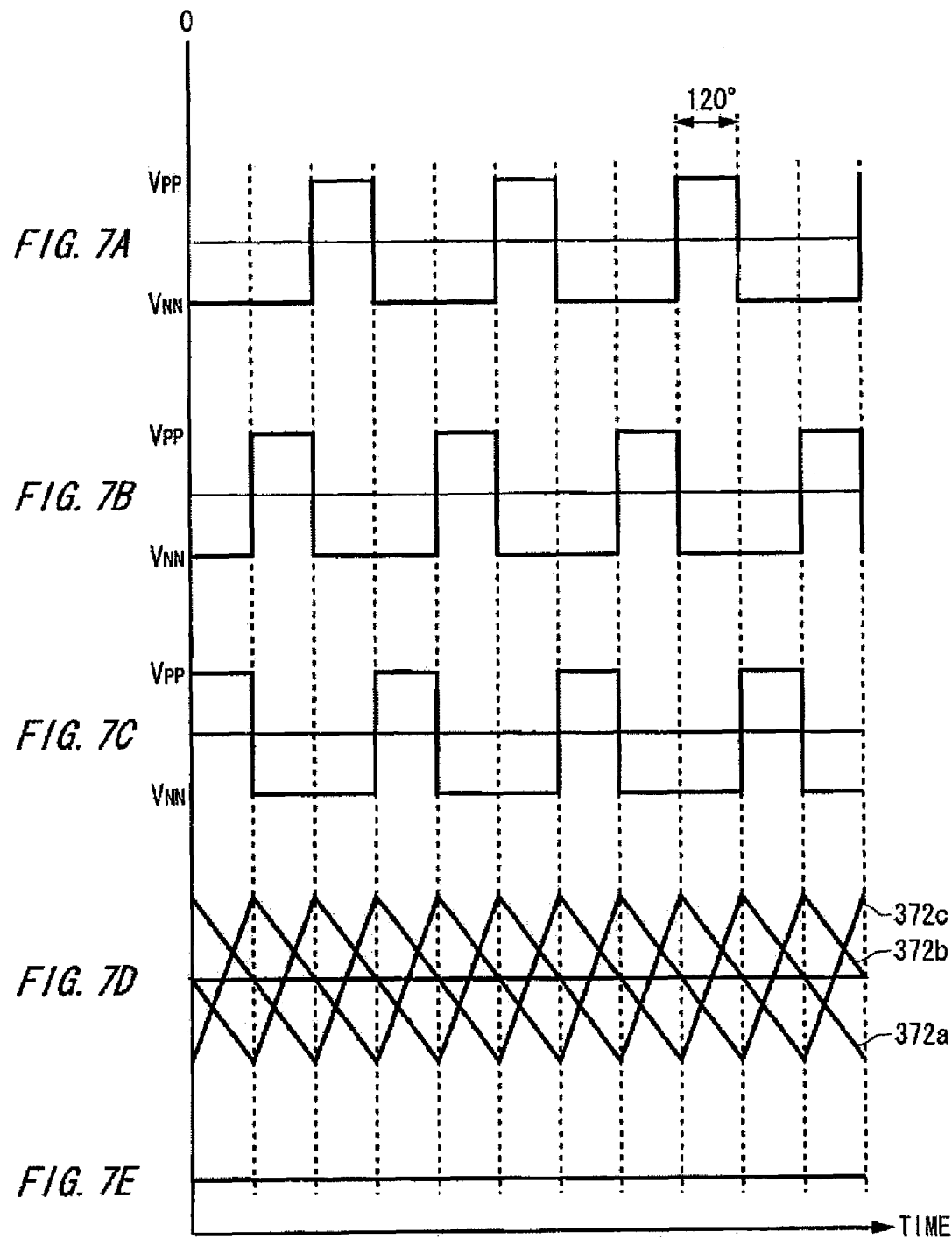

US 7,394,234 B2

POWER SUPPLY CIRCUIT AND TEST APPARATUS

CROSS REFERENCE TO RELATED APPLICATION

The present application claims priority from a Japanese Patent Application(s) No. 2005-083581 filed on Mar. 23, 2005, the contents of which are incorporated herein by reference.

BACKGROUND OF THE INVENTION

1. Field of the Invention

The present invention relates to a power-supply circuit and a test apparatus. More specifically, the invention relates to a power-supply circuit for supplying voltage to a load and a test apparatus for testing a device-under-test.

2. Related Art

Conventionally, there has been known a power-supply circuit for supplying predetermined voltage to a load by using a switching amplifying circuit (Takamasa Hori, Inter-University Power Electronics, First Edition, Ohmsha Ltd., December, 1996, pp. 85-102). Such power-supply circuit supplies the predetermined voltage to the load by switching, by means of a switch, a case of supplying the predetermined voltage to the load as power-supply voltage generated by a power supply accumulates electromagnetic energy in an inductance provided on a circuit and a case of supplying the predetermined voltage to the load by disconnecting the power supply from the load and by regenerating the current by using the electromagnetic energy accumulated in the inductance. Then, in such power-supply circuit, the voltage $V_0$ supplied to the load may be represented by means of a duty ratio D between a first switch for connecting the power-supply voltage to the inductance and a second switch for regenerating the current by the inductance, and of the power-supply voltage $V_s$ as $V_0 = V_s \times D$.

Although the conventional power-supply circuit is capable of controlling the voltage $V_0$ to be supplied to the load by controlling the duty ratio D, it has been unable to freely select positive voltage and negative voltage and to supply them to the load by using single power supply because a polarity of the $V_0$ is decided by a polarity of the power-supply voltage $V_s$.

The voltage supplied to the load also varies due to connection and disconnection of the switches in the power-supply circuit using the switching amplifying circuit. Accordingly, output ripple voltage in the voltage supplied to the load is not zero and noise components of the power-supply circuit caused by the output ripple voltage have been a problem.

SUMMARY OF THE INVENTION

Accordingly, it is an object of the invention to provide a power supply and a test apparatus, which are capable of solving the above-mentioned problems. This object may be achieved through the combination of features described in independent claims of the invention. Dependent claims thereof specify preferable embodiments of the invention.

That is, according to a first aspect of the invention, there is provided a power-supply circuit for supplying voltage to a load, having a power supply that generates power-supply voltage, an inverted outputting circuit having a positive voltage terminal for outputting positive voltage based on the power-supply voltage and a negative voltage terminal for outputting negative voltage generated based on the power-supply voltage and having different polarity from the positive voltage and outputting the positive and negative voltage while keeping the same direction in terms of directions of electric current flowing between the positive voltage terminal and the outside and of electric current flowing between the negative voltage terminal and the outside and a step-down output circuit for supplying predetermined voltage to the load by connecting the positive voltage terminal and the negative voltage terminal to the load while switching them with a predetermined duty ratio.

The inverted outputting circuit may further include an inverting inductance whose one end is connected to the side of a negative electrode of the power supply and whose other end is connected to the side of a negative voltage terminal and a first inverting switch whose one end is connected to the side of the other end of the inverting inductance and whose other end is connected to the side of the negative voltage terminal.

The inverted output circuit may further include a second inverting switch whose one end is connected to a line between another end of the inverting inductance and one end of the first inverting switch and whose other end is connected to a line between a positive electrode of the power supply and the positive voltage terminal and the power-supply circuit further includes a inverted output control section for controlling the first and second inverting switches so as to disconnect the second inverting switch in connecting the first inverting switch and to connect the second inverting switch in disconnecting the first inverting switch.

The inverted output control section may decide inverted on-duty that is a ratio of time during which the second inverting switch is connected to time during which the first inverting switch is connected so as to flow feedback current from the negative voltage terminal to the outside into the inverting inductance so that the inverting inductance generates predetermined negative voltage in flowing the current from the negative voltage terminal to the outside.

The step-down output circuit may have a step-down inductance whose one end is connected to the side of the positive voltage terminal and the negative voltage terminal and whose other end is connected to the side of the load, a first step-down switch whose one end is connected to the side of the negative voltage terminal and whose other end is connected to a line between the positive voltage terminal and the step-down inductance and a second step-down switch whose one end is connected to the side of the positive voltage terminal and whose other end is connected to a line between the other end of the first step-down switch and one end of the step-down inductance, and the power-supply circuit may further include a step-down output control section for controlling the first and second step-down switches so as to disconnect the second step-down switch in connecting the first step-down switch and to connect the second step-down switch in disconnecting the first step-down switch, and the inverted output control section may decide the inverted on-duty that prolongs a time during which the second inverting switch is connected to be longer than a time during which the second step-down switch is connected in flowing current from the negative voltage terminal to the outside.

The inverted output control section may also decide the inverted on-duty so as to flow the current flown into the negative voltage terminal into the inverting inductance so that the inverting inductance generates the predetermined negative voltage in flowing the current from the outside to the negative voltage terminal.

The inverted output control section may decide the inverted on-duty that shortens a time during which the second inverting switch is connected to be less than a time during which the second step-down switch is connected in flowing current from the outside to the negative voltage terminal.

The inverted output circuit may further include an inverted capacitor whose one end is connected to a line between a negative electrode of the power supply and one end of the inverting inductance and whose other end is connected to a line between the negative voltage terminal and the other end of the first inverting switch.

The step-down output control section may have a first difference detector for detecting a difference between voltage being supplied from the step-down inductance to the load and reference voltage to be supplied to the load, and a step-down on-duty deciding circuit for deciding step-down on-duty that is a ratio of a time during which the second step-down switch is connected to a time during which the step-down switch is connected so that the voltage supplied to the load approaches to the reference voltage based on the result detected by the first difference detector.

The power-supply circuit may include a plurality of step-down output circuits for supplying voltage to loads different from each other, wherein the inverted output circuit outputs the positive voltage and the negative voltage to each of the plurality of step-down output circuits by keeping the same direction in terms of directions of current flowing between the positive voltage terminal and each of the plurality of step-down output circuits and of current flowing between the negative voltage terminal and each of the plurality of step-down output circuits.

The power-supply circuit may further include first and second step-down output circuits for supplying voltage to the load, wherein the inverted output circuit outputs the positive voltage and the negative voltage to each of the first and second step-down output circuits by keeping the same direction in terms of directions of current flowing between the positive voltage terminal and each of the first and second step-down output circuits and of current flowing between the negative voltage terminal and each of the first and second step-down output circuits, the step-down output control section sequentially connects each of the second step-down switches of the first and second step-down output circuits per equal time, and the inverted output control section decides negative voltage to be outputted out of the negative voltage terminal so as to equalize a time during which the second step-down switch of the first and second step-down output circuits is connected with a time during which the first step-down switch is connected based on the predetermined voltage to be supplied to the load and the power-supply voltage.

The power-supply circuit may further include a plurality of step-down output circuits for supplying voltage to the load, wherein the inverted output circuit outputs the positive voltage and the negative voltage to each of the plurality of step-down output circuits by keeping the same direction in terms of directions of current flowing between the positive voltage terminal and each of the plurality of step-down output circuits and of current flowing between the negative voltage terminal and each of the plurality of step-down output circuits, the step-down output control section sequentially connects each of the second step-down switches of the plurality of step-down output circuits per equal time, and the inverted output control section decides negative voltage to be outputted out of the negative voltage terminal so as to equalize a time during which the second step-down switch of each of plurality of step-down output circuits is disconnected with a sum of time during which the second step-down switches of all step-down output circuits other than the pertinent step-down output circuit are connected based on the predetermined voltage to be supplied to the load and the power-supply voltage.

According to a second aspect of the invention, there is provided a test apparatus for testing a device-under-test, having a power source for generating power-supply voltage, an inverted output circuit having a positive voltage terminal for outputting positive voltage based on the power-supply voltage and a negative voltage terminal for outputting negative voltage that has been generated based on the power-supply voltage and whose polarity is different from the positive voltage, and outputting the positive voltage and the negative voltage by keeping the same direction in terms of directions of current flowing between the positive voltage terminal and the outside and of current flowing between the negative voltage terminal and the outside, a step-down output circuit for supplying predetermined voltage to the device-under-test by connecting the positive voltage terminal and the negative voltage terminal to the device-under-test while switching them with a predetermined duty ratio, and a testing section for testing the device-under-test in the state in which voltage is supplied by the step-down output circuit to the device-under-test.

The test apparatus may have a plurality of step-down output circuits for supplying voltage to device-under-tests different from each other and the inverted output circuit may output the positive voltage and the negative voltage to the plurality of step-down output circuits by keeping the same direction in terms of directions of current flowing between the positive voltage terminal and each of the plurality of step-down output circuits and of current flowing between the negative voltage terminal and each of the plurality of step-down output circuits.

The test apparatus may have first and second step-down output circuits for supplying voltage to the device-under-test and the inverted output circuit may outputs the positive voltage and the negative voltage to each of the first and second step-down output circuits by keeping the same direction in terms of directions of current flowing between the positive voltage terminal and each of the first and second step-down output circuits and of current flowing between the negative voltage terminal and each of the first and second step-down output circuits, and the step-down output control section sequentially connects each of the second step-down switches of the first and second step-down output circuits per equal time.

It is noted that the summary of the invention described above does not necessarily describe all necessary features of the invention. The invention may also be a sub-combination of the features described above.

BRIEF DESCRIPTION OF THE DRAWINGS

FIG. 5 is a chart showing a first example of temporal variations of current flowing into/out of a step-down capacitor 380 of the power-supply circuit 35 according the embodiment of the invention.

FIG. 6 is a chart showing a second example of the temporal variations of the current flowing into/out of the step-down capacitor 380 of the power-supply circuit 35 according the embodiment of the invention.

FIG. 7 is a chart showing a third example of the temporal variations of the current flowing into/out of the step-down capacitor 380 of the power-supply circuit 35 according the embodiment of the invention.

DETAILED DESCRIPTION OF THE INVENTION

The invention will now be described based on preferred embodiments, which do not intend to limit the scope of the invention, but exemplify the invention. All of the features and the combinations thereof described in the embodiments are not necessarily essential to the invention.

Figure 1:
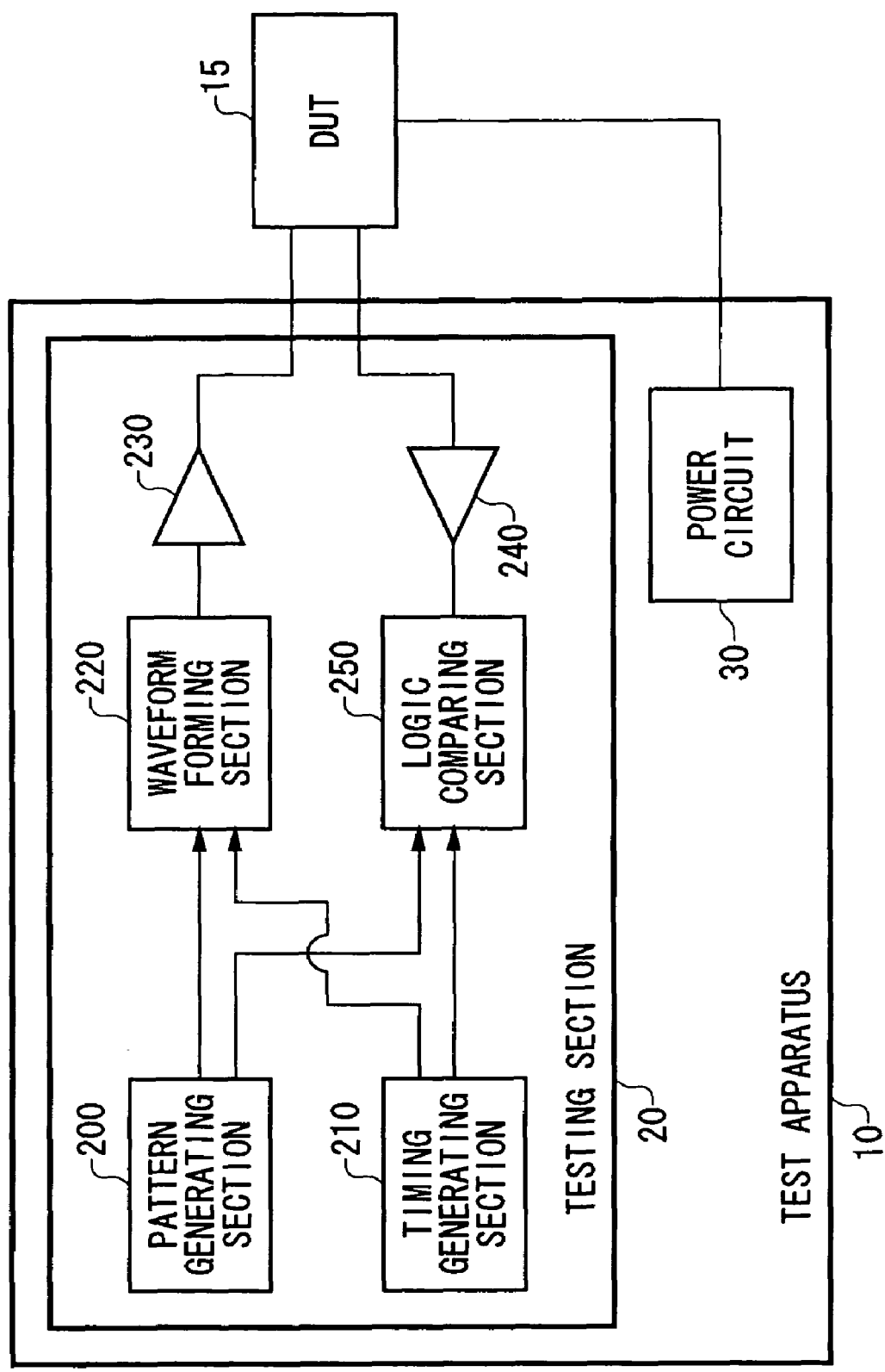
FIG. 1 is a block diagram showing one exemplary configuration of a test apparatus 10 according to an embodiment of the invention.

FIG. 1 is a block diagram showing one exemplary configuration of a test apparatus 10 according to an embodiment of the invention. The test apparatus 10 of the present embodiment tests a DUT (Device Under Test) 15. It is also an object of the test apparatus 10 to be able to freely select positive voltage and negative voltage as driving voltage and to supply them to the DUT 15. It is another object of the test apparatus 10 to be able to reduce noise components received by the DUT 15 by reducing output ripple voltage in the voltage supplied to the DUT 15.

The test apparatus 10 of the present embodiment has a testing section 20 and a power-supply circuit 30. The testing section 20 tests the DUT 15 in a state in which the power-supply circuit 30 supplies voltage to the DUT 15. The testing section 20 has a pattern generating section 200, a timing generating section 210, a waveform forming section 220, a driver 230, a comparator 240 and a logic comparing section 250. The pattern generating section 200 generates a pattern of a test signal to be supplied to the DUT 15 and an expected value corresponding to that pattern. Then, the pattern generating section 200 outputs the pattern thus generated to the waveform forming section 220. The pattern generating section 200 also outputs the generated expected value to the logic comparing section 250. The timing generating section 210 generates a timing signal representing timing for supplying the test signal to the DUT 15. Then, the timing generating section 210 outputs the generated timing signals to the waveform forming section 220 and the logic comparing section 250.

The waveform forming section 220 forms waveform of the test signal based on the pattern of the test signal generated by the pattern generating section 200 and the timing signal generated by the timing generating section 210. Then, the waveform forming section 220 outputs the test signal whose waveform has been formed to the driver 230. The driver 230 supplies the test signal received from the waveform forming section 220 to the DUT 15. The comparator 240 compares an output signal outputted out of the DUT 15 in correspondence to the test signal supplied to the driver 230 with predetermined reference voltage. Then, the comparator 240 outputs a logic value, i.e., the result of the comparison, to the logic comparing section 250. The logic comparing section 250 compares the logic value received from the comparator 240 with the expected value received from the pattern generating section 200. Then, when the received logic value does not coincide with the expected value, the logic comparing section 250 judges that the DUT 15 is defective. The power-supply circuit 30 supplies voltage to the DUT 15 to drive the DUT 15.

Figure 2:
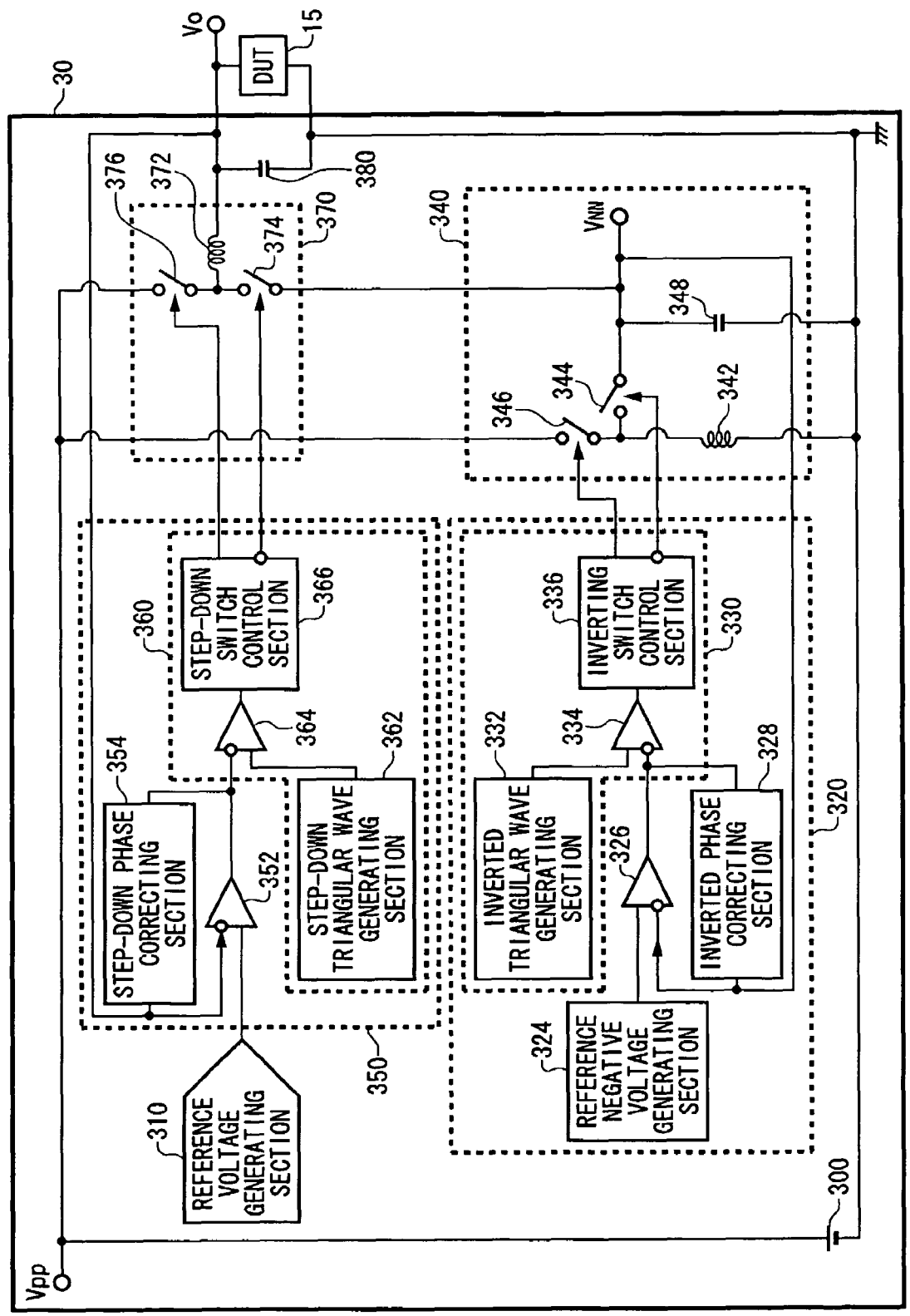
FIG. 2 is a diagram showing one exemplary configuration of a power-supply circuit 30 according to the embodiment of the invention.

FIG. 2 is a diagram showing one exemplary configuration of the power-supply circuit 30 of the present embodiment. The power-supply circuit 30 of the present embodiment has a power supply 300, a reference voltage generating section 310, an inverted output control section 320, an inverted output circuit 340, a step-down output control section 350, a step-down output circuit 370 and a step-down capacitor 380. The power supply 300 generates power-supply voltage and outputs the generated power-supply voltage to the inverted output control section 320, the inverted output circuit 340 and the step-down output circuit 370. The reference voltage generating section 310 generates reference voltage that is the standard of the voltage to be supplied to the DUT 15. Then, the reference voltage generating section 310 outputs the generated reference voltage to the step-down output control section 350.

The inverted output control section 320 includes a reference negative voltage generating section 324, a difference detector 326, an inverted phase correcting section 328 and an inverted on-duty deciding section 330. The reference negative voltage generating section 324 generates reference negative voltage that is the standard of the negative voltage to be generated by the inverted output circuit 340. Then, the reference negative voltage generating section 324 outputs the generated reference negative voltage to the difference detector 326. The difference detector 326 outputs a signal that represents a difference between the reference negative voltage received from the reference negative voltage generating section 324 and the negative voltage generated by the inverted output circuit 340, i.e., a signal in which a difference between the reference negative voltage and the negative voltage generated by the inverted output circuit 340 is amplified, to the inverted on-duty deciding section 330. The inverted phase correcting section 328 corrects phase of the negative voltage outputted out of the inverted output circuit 340 and inputted to the difference detector 326 so that phase of the signal outputted out of the difference detector 326 becomes closer to the phase of the signal representing the negative voltage outputted out of the inverted output circuit 340. It enables the difference detector 326 to accurately calculate the difference between the reference negative voltage and the negative voltage generated by the inverted output circuit 340.

Based on the result detected by the difference detector 326, the inverted on-duty deciding section 330 controls the inverted output circuit 340 so that the negative voltage outputted out of the inverted output circuit 340 becomes closer to the reference negative voltage. The inverted on-duty deciding section 330 includes an inverted triangular wave generating section 332, a comparator 334 and an inverting switch control section 336. The inverted triangular wave generating section 332 generates a signal presenting a triangular wave having predetermined amplitude and frequency. Then, the inverted triangular wave generating section 332 outputs the generated signal to the comparator 334. The comparator 334 outputs a difference between the signal received from the inverted triangular wave generating section 332 and the signal representing the difference between the negative voltage generated by the inverted output circuit 340 and the reference negative voltage, received from the difference detector 326, to the inverting switch control section 336 as a comparison result. Here, the comparator 334 may amplify and output the comparison result to the inverting switch control section 336.

Based on the signal received from the comparator 334, the inverting switch control section 336 controls first and second switches 344 and 346 contained in the inverted output circuit 340. Here, the inverting switch control section 336 inverts a signal for controlling the first inverting switch 344 and a signal for controlling the second inverting switch 346 from each other. That is, the inverting switch control section 336 controls the first and second inverting switches 344 and 346 so as to disconnect the second inverting switch 346 in connecting the first inverting switch 344 and to connect the second inverting switch 346 in disconnecting the first inverting switch 344. More specifically, the inverting switch control section 336 may connect the second inverting switch 346 during when the signal received from the comparator 334 presents a positive difference, i.e., during when the logic value is H for example, by outputting the received signal as a control signal of the second inverting switch 346. The inverting switch control section 336 may also connect the first inverting switch 344 during when the signal received from the comparator 334 presents a negative difference, i.e., during when the logic value is L for example, by outputting an inversion signal of the received signal as a control signal of the first inverting switch 344. The inverted on-duty deciding section 330 decides inverted on-duty that is a ratio of a time during which the second inverting switch 346 is connected to a time during which the first inverting switch 344 is connected by performing PWM (Pulse Width Modulation) as described above.

The inverted output circuit 340 includes a positive voltage terminal for outputting positive voltage $V_{PP}$ based on the power-supply voltage and a negative voltage terminal for outputting negative voltage $V_{NN}$ that is generated based on the power-supply voltage and whose polarity is different from the positive voltage $V_{PP}$, and outputs the positive voltage $V_{PP}$ and the negative voltage $V_{NN}$ while keeping the same direction in terms of directions of current flowing between the positive voltage terminal and the outside, i.e., the step-down output circuit 370, and of current flowing between the negative voltage terminal and the outside. The inverted output circuit 340 includes an inverting inductance 342, the first inverting switch 344, the second inverting switch 346 and an inverted capacitor 348. One end of the inverting inductance 342 is connected to the negative electrode side of the power supply 300. Another end of the inverting inductance 342 is connected to the side of the negative voltage terminal, i.e., to the negative voltage terminal via the first inverting switch 344. One end of the first inverting switch 344 is connected to the side of the other end of the inverting inductance 342 and another end thereof is connected to the side of the negative voltage terminal. One end of the second inverting switch 346 is connected to a line between the other end of the inverting inductance 342 and one end of the first inverting switch 344 and another end thereof is connected to a line between the positive electrode of the power supply 300 and the positive voltage terminal that is an end for outputting positive voltage to the step-down output circuit 370. One end of the inverted capacitor 348 is connected to a line between the negative electrode of the power supply 300 and one end of the inverting inductance 342 and another end thereof is connected to a line between the negative voltage terminal and the other end of the first inverting switch 344.

The step-down output control section 350 includes a difference detector 352, a step-down phase correcting section 354 and a step-down on-duty deciding section 360. The difference detector 352 outputs a signal presenting a difference between the reference voltage received from the reference voltage generating section 310 and the voltage outputted out of the step-down output circuit 370 to the step-down on-duty deciding section 360. The step-down phase correcting section 354 corrects phase of the signal outputted out of the step-down output circuit 370 and inputted to the difference detector 352 so that the phase of the signal outputted out of the difference detector 352 becomes closer to the phase of the signal presenting the voltage outputted out of the step-down output circuit 370. It enables the step-down phase correcting section 354 to accurately calculate the difference between the reference voltage and the voltage outputted out of the step-down output circuit 370.

Based on the result detected by the difference detector 352, the step-down on-duty deciding section 360 controls the step-down output circuit 370 so that the voltage supplied to the DUT 15 becomes closer to the reference voltage. The step-down on-duty deciding section 360 includes a step-down triangular wave generating section 362, a comparator 364 and a step-down switch control section 366. The step-down triangular wave generating section 362 generates a signal presenting a triangular wave having predetermined amplitude and frequency. Then, the step-down triangular wave generating section 362 outputs the generated signal to the comparator 364. The comparator 364 outputs a difference between the signal received from the step-down triangular wave generating section 362 and the signal received from the difference detector 352 as a comparison result.

Based on the signal received from the comparator 364, the step-down switch control section 366 controls a first step-down switch 374 and a second step-down switch 376 contained in the step-down output circuit 370. Here, the step-down switch control section 366 inverts a signal for controlling the first step-down switch 374 and a signal for controlling the second step-down switch 376 from each other. That is, the step-down switch control section 366 controls the first and second step-down switches 374 and 376 so as to disconnect the second step-down switch 376 in connecting the first step-down switch 374 and to connect the second step-down switch 376 in disconnecting the first step-down switch 374. More specifically, the step-down switch control section 366 connects the second step-down switch 376 during when the signal received from the comparator 364 presents a positive difference, i.e., during when the logic value is H for example, by outputting the received signal as a control signal of the second step-down switch 376. The step-down switch control section 366 may also connect the first step-down switch 374 during when the received signal presents a negative difference, i.e., during when the logic value is L for example, by outputting an inversion signal of the received signal as a control signal of the first step-down switch 374. The step-down on-duty deciding section 360 decides step-down on-duty that is a ratio of a time during which the second step-down switch 376 is connected to a time during which the first step-down switch 374 is connected by performing PWM (Pulse Width Modulation) as described above.

The step-down output circuit 370 supplies predetermined voltage to the DUT 15 by connecting the positive voltage terminal and the negative voltage terminal contained in the inverted output circuit 340 with the DUT 15 while switching them by the predetermined duty ratio. The step-down output circuit 370 includes a step-down inductance 372, the first step-down switch 374 and the second step-down switch 376. One end of the step-down inductance 372 is connected to the side of the positive voltage terminal and the negative voltage terminal and another end thereof is connected to the side of the DUT 15. One end of the first step-down switch 374 is connected to the side of the negative voltage terminal and another end thereof is connected to a line between the positive voltage terminal and one end of the step-down inductance 372. One end of the second step-down switch 376 is connected to the side of the positive voltage terminal and another end thereof is connected to a line between the other end of the first step-down switch 374 and one end of the step-down inductance 372. One end of the step-down capacitor 380 is connected to a line between the step-down inductance 372 and the DUT 15 and another end thereof is connected to a line between the DUT 15 and the negative electrode of the power supply 300.

FIG. 3 is a chart showing one exemplary temporal variations of current flown from the power-supply circuit 30 of the present embodiment. This chart exemplifies the case in deciding the inverted on-duty and the step-down on-duty so as to flow the current between the negative voltage terminal contained in the inverted output circuit 340 and the step-down output circuit 370 in a direction from the negative voltage terminal to the step-down output circuit 370. In this case, the inverted output control section 320 decides the inverted on-duty so as to flow feedback current from the step-down output circuit 370 to the inverted output circuit 340 into the inverting inductance 342 so that the inverting inductance 342 generates predetermined negative voltage. More specifically, the inverted output control section 320 employs the inverted on-duty that is smaller than the step-down on-duty and that shortens the time during which the second inverting switch 346 is connected to be less than the time during which the second step-down switch 376 is connected. In this case, an average value $V_O$ of the voltage supplied from the step-down output circuit 370 to the DUT 15 is a plus value. It is noted that in the power-supply circuit 30 of the present embodiment, the first and second inverting switches 344 and 346 and the first and second step-down switches 374 and 376 need not be controlled in synchronism from each other and may be switched at different periods. This will be explained more concretely below with reference to FIG. 3.

Figure 3A:
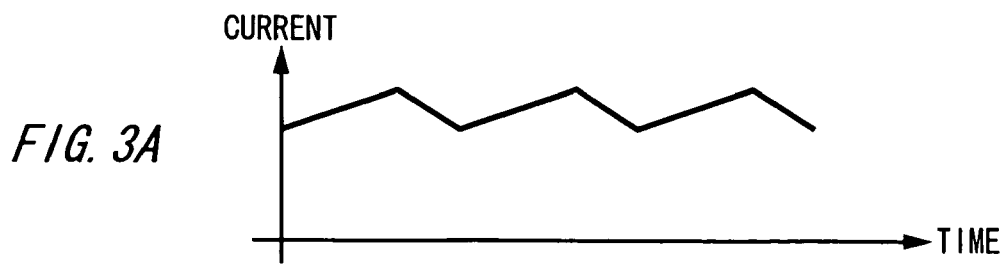
FIG. 3 is a chart showing one exemplary temporal variations of current flown by the power-supply circuit 30 of the embodiment of the invention.
Figure 3B:
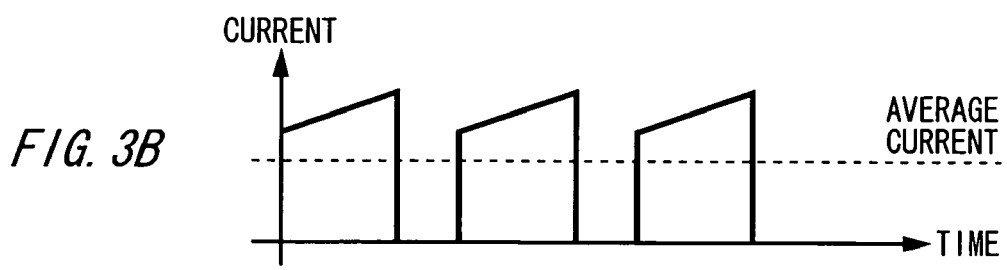
Figure 3C:
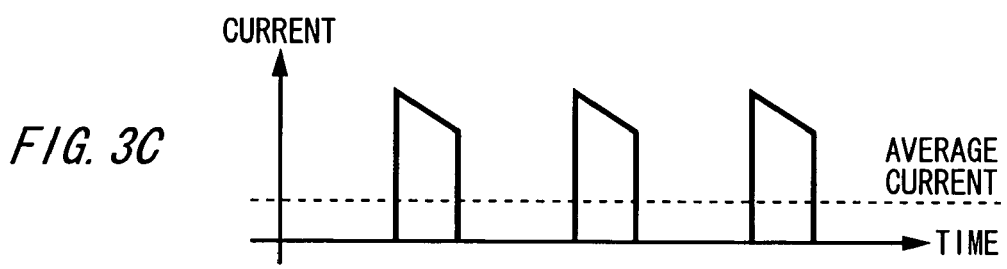

The step-down inductance 372 of the present embodiment flows current in the direction of the DUT 15 with temporal variations as shown in FIG. 3a. When the first step-down switch 374 is disconnected and the second step-down switch 376 is connected, the step-down inductance 372 accumulates electromagnetic energy that flows the current in the direction of the DUT 15 by the positive voltage $V_{PP}$ based on the power-supply voltage. In this case, the current flowing from the step-down inductance 372 to the DUT 15 increases. Then, when the first step-down switch 374 is connected and the second step-down switch 376 is disconnected in the state in which the electromagnetic energy is accumulated in the step-down inductance 372, the step-down inductance 372 continuously flows the current in the direction of the DUT 15 and releases the accumulated electromagnetic energy. In this case, the current flowing from the step-down inductance 372 to the DUT 15 decreases. Thereby, the second step-down switch 376 flows current in the direction of the step-down inductance 372 with temporal variations as shown in FIG. 3b. The first step-down switch 374 also flows current in the direction of the step-down inductance 372 with temporal variations as shown in FIG. 3c.

Figure 3D:
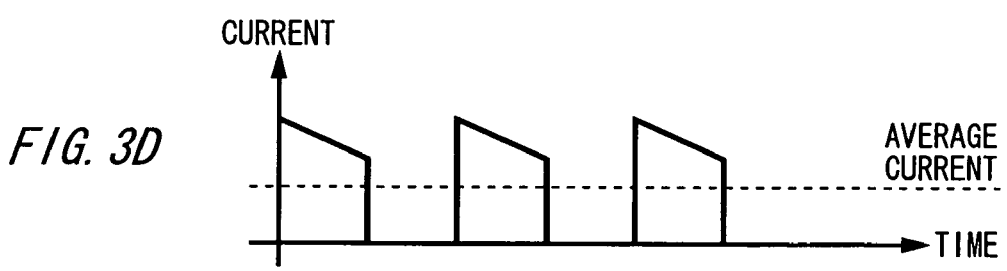
Figure 3E:
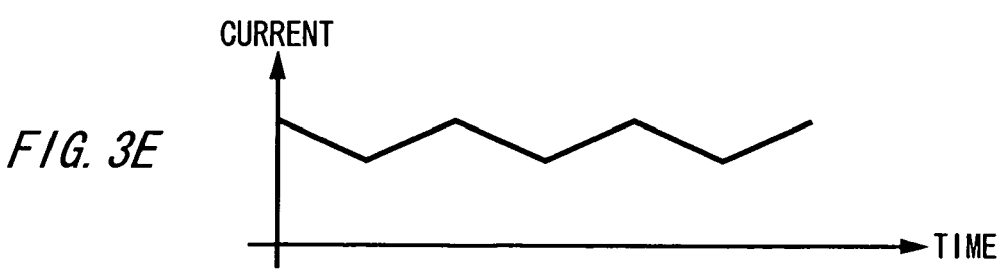

Still more, current flows into the inverting inductance 342 so as to compensate the current flown out of the negative voltage terminal during when the first inverting switch 344 is connected. Thereby, the inverting inductance 342 accumulates electromagnetic energy that causes a flow of the current in the direction of the negative voltage terminal. In this case, the current flowing from the inverting inductance 342 to the negative voltage terminal increases and the voltage at the end of the inverting inductance 342 becomes negative. Then, when the first inverting switch 344 is disconnected and the second inverting switch 346 is connected in the state in which the electromagnetic energy is accumulated in the inverting inductance 342, the inverting inductance 342 continuously flows the current to the side of the positive voltage terminal and as a result, the electromagnetic energy accumulated in the inverting inductance 342 decreases. In this case, the current flowing from the inverting inductance 342 to the positive voltage terminal decreases. Thus, the second inverting switch 346 flows the current in the direction of the step-down output circuit 370 with temporal variations as shown in FIG. 3d. Still more, the inverting inductance 342 flows the current in the direction of the step-down output circuit 370 via the positive voltage terminal and negative voltage terminal with temporal variations as shown in FIG. 3e.

Figure 3F:
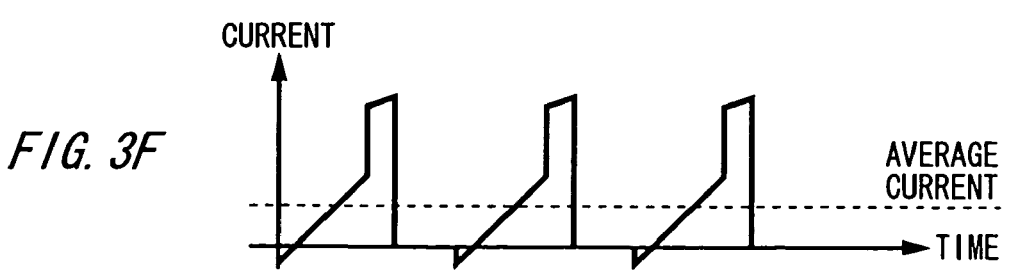

It is noted that the current outputted out of the power supply 300 is equivalent to current obtained by subtracting the current flown by the second inverting switch 346 in the direction of the step-down output circuit 370 as shown in FIG. 3d from the current flown by the second step-down switch 376 in the direction of the step-down inductance 372 as shown in FIG. 3b. Accordingly, the power supply 300 flows the current with temporal variations as shown in FIG. 3f. That is, an average value of the current flown by the power supply 300 is a plus value and the current will not flow backward to the power supply 300.

Next, the point why the current does not flow backward to the power supply 300 will be explained by using numerical expressions. The step-down on-duty that is the ratio of the time during which the second step-down switch 376 is connected to the time during which the first step-down switch 374 is connected will be denoted as $D_1$ hereinafter. Still more, the inverted on-duty that is the ratio of the time during which the second inverting switch 346 is connected to the time during which the first inverting switch 344 is connected will be denoted as $D_2$.

The negative voltage $V_{NN}$ outputted out of the inverted output circuit 340 may be expressed by using the positive voltage $V_{PP}$ and the inverted on-duty $D_2$, as follows:

$$V_{NN} = -\frac{D_2}{1-D_2} \times V_{PP} \quad (1)$$

$V_{PP}$ is supplied to the DUT 15 when the second step-down switch 376 is connected and $V_{NN}$ is supplied to the DUT 15 when the first step-down switch 374 is connected, so that an average value $V_O$ of the voltage supplied to the DUT 15 may be expressed as follows:

$$V_O = V_{PP} \times D_1 + V_{NN} \times (1-D_1) \quad (2)$$

Accordingly, $V_O$ may be expressed from the equations (1) and (2), as follows:

$$V_O = \frac{D_1 - D_2}{1 - D_2} \times V_{PP} \quad (3)$$

Still more, when an average value of the current flowing through the DUT 15 in the direction from the step-down output circuit 370 to the side of the negative electrode of the power supply 300 is denoted as $I_O$, an average value $I_{P1}$ of the current flowing through the second step-down switch 376 in the direction of the step-down inductance 372 may be expressed as follows:

$$I_{P1} = I_O \times D_1 \quad (4)$$

Meanwhile, an average value $I_{N1}$ of the current flowing through the first step-down switch 374 in the direction of the step-down inductance 372 may be expressed as follows:

$$I_{N1} = I_O \times (1-D_1) \quad (5)$$

An average value $I_{N2}$ of the current flowing through the first inverting switch 344 is the same with $I_{N1}$, $$I_{N2} = IN_1 \quad (6)$$

Then, because a ratio of the average values $I_{P2}$ of the currents flowing through the second inverting switch 346 to $I_{N2}$ is the inverted on-duty, so that $I_{P2}$ may be expressed as follows:

$$I_{P2} = \frac{D_2}{1-D_2} \times I_{N1} \quad (7)$$

From the above, the average value $I_{IN}$ of the current outputted out of the power supply 300 may be expressed as follows:

$$I_{IN} = I_{P1} - I_{P2} \quad (8)$$
$$= \frac{D_1 - D_2}{1-D_2} \times I_O$$

Here, the relationship between $I_O$ and $V_O$ may be expressed by using internal resistance R of the DUT 15, as follows:

$$I_O = \frac{V_O}{R} \quad (9)$$

Accordingly, $I_{IN}$ may be expressed by using the equations (3), (8) and (9), as follows:

$$I_{IN} = \left(\frac{D_1 - D_2}{1-D_2}\right)^2 \times \frac{V_{PP}}{R} \quad (10)$$

Because $V_{PP}$ is a plus value, $I_{IN}$ also becomes a plus value. That is, the current will not flow backward to the power supply 300.

The case when the average current between the negative voltage terminal and the step-down output circuit 370 flows in the direction from the negative voltage terminal to the step-down output circuit 370 has been explained above. Next, a case when the average current between the negative voltage terminal and the step-down output circuit 370 flows in a direction from the step-down output circuit 370 to the negative voltage terminal will be explained.

In this case, the inverted output control section 320 decides the inverted on-duty so as to flow the current that has flown into the negative voltage terminal to the inverting inductance 342 so that the inverting inductance 342 generates predetermined negative voltage. More specifically, the inverted output control section 320 employs the inverted on-duty that is larger than the step-down on-duty and that prolongs a time during which the second inverting switch 346 is connected to be longer than a time during which the second step-down switch 376 is connected. Thereby, when the first inverting switch 344 is connected, the inverted output control section 320 releases the electromagnetic energy that has been accumulated by the positive voltage $V_{PP}$ during when the second inverting switch 346 has been connected to regenerate current and flows the current in the direction from the step-down output circuit 370 to the negative voltage terminal. In this case, the average value $V_O$ of the voltage supplied from the step-down output circuit 370 to the DUT 15 becomes a minus value as it is apparent from the equation (3).

It is noted that the direction in which the current flows through the DUT 15, the step-down inductance 372, the first step-down switch 374, the second step-down switch 376, the inverting inductance 342, the first inverting switch 344 and the second inverting switch 346 is opposite from the case explained in connection with the equations (1) through (7). Accordingly, the current outputted out of the power supply 300 is equivalent to the current obtained by subtracting the average value $I_{P1}$ of the current flown by the second step-down switch 376 in the direction of the inverted output circuit 340 from the average value $I_{P2}$ of the current flown by the second inverting switch 346 in the direction of the inverting inductance 342. In this case, the relationship between $I_O$ and $V_O$ may be expressed as follows:

$$I_O = -\frac{V_O}{R} \quad (11)$$

Accordingly, $I_{IN}$ may be expressed by the equation (10) also in this case. That is, $I_{IN}$ is a plus value and the current will not flow backward to the power supply 300 also in this case.

As described above, the power-supply circuit 30 of the present embodiment allows the positive voltage and the negative voltage to be freely selected from the single power supply 300 and to be supplied to the DUT 15 without flowing the current backward to the power supply 300. More specifically, it is capable of prevent the current from flowing backward to the power supply 300 even when minus voltage is to be supplied to the DUT 15 by regenerating the current by using the inverting inductance 342. It also allows various voltages to be supplied to the DUT 15 by controlling the step-down on-duty and inverted on-duty.

Then, it allows the direction of the average current flowing through the step-down inductance 372 to be altered in the direction from the step-down inductance 372 to the DUT 15 by prolonging the time during which the electromagnetic energy of the step-down inductance 372 is accumulated or released to be longer than the time during which the positive voltage $V_{PP}$ accumulates the electromagnetic energy in the inverting inductance 342. That is, it allows plus voltage to be supplied to the DUT 15.

It also allows the direction of the average current flowing through the step-down inductance 372 to be altered in the direction from the DUT 15 to the step-down inductance 372 by shortening the time during which the positive voltage $V_{PP}$ accumulates or releases the electromagnetic energy of the step-down inductance 372 to be shorter than the time during which the positive voltage $V_{PP}$ accumulates the electromagnetic energy in the inverting inductance 342. That is, it allows minus voltage to be supplied to the DUT 15.

Still more, it allows the current to be supplied to the step-down inductance 372 during when the first step-down switch 374 is connected even in a state in which the first inverting switch 344 is disconnected by providing the inverted capacitor 348.

Furthermore, it allows the negative voltage and the output voltage of the step-down output circuit 370 to be accurately controlled by deciding the inverted on-duty based on the difference between the reference negative voltage and the negative voltage outputted out of the inverted output circuit 340 or by deciding the step-down on-duty based on the difference between the reference voltage and the voltage outputted out of the step-down output circuit 370.

Then, the use of the test apparatus 10 having the power-supply circuit 30 described above allows various DUTs 15 having different driving voltages to be tested.

Figure 4:
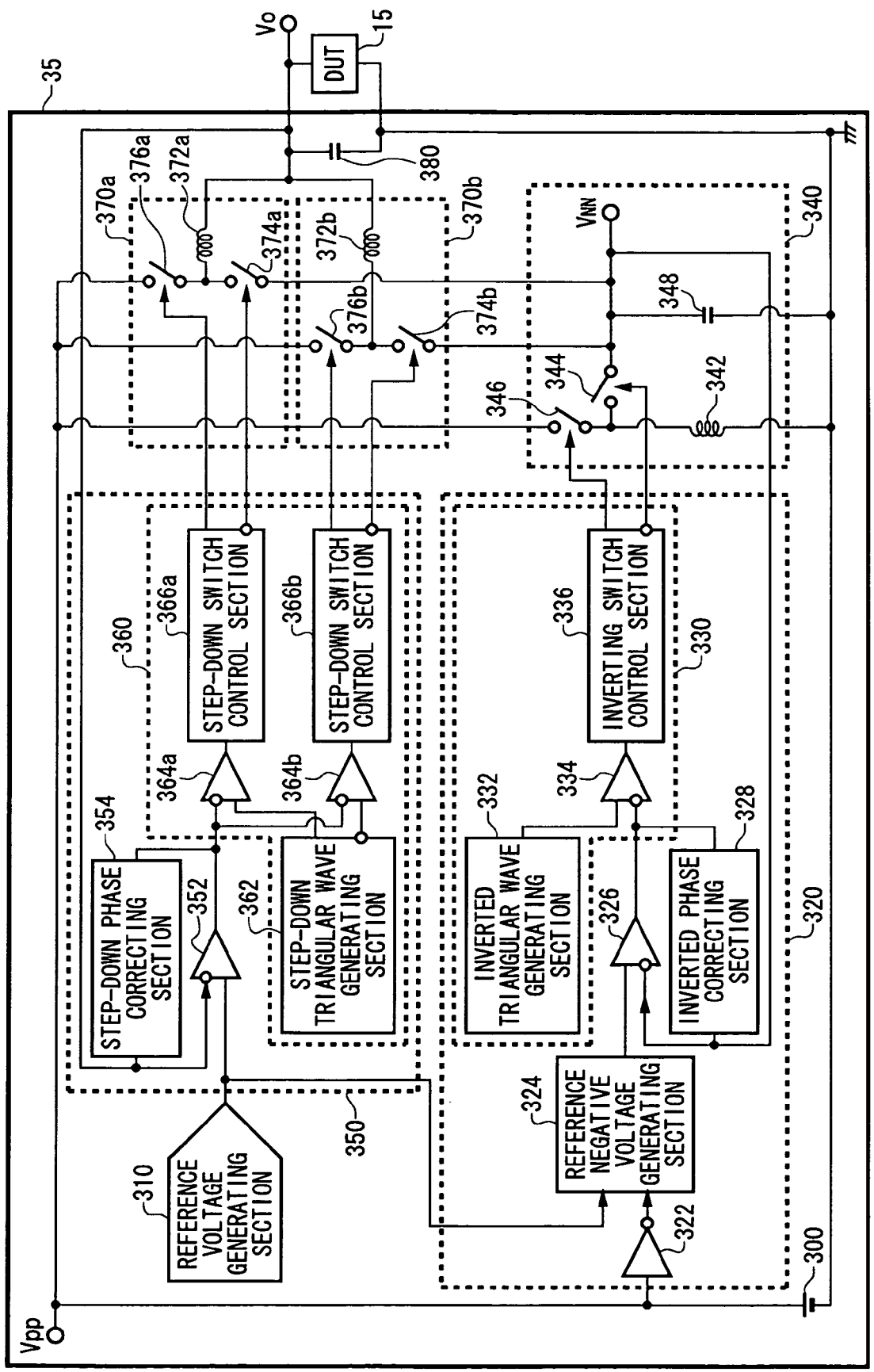
FIG. 4 is a diagram showing one exemplary configuration of a power-supply circuit 35, which is another example of the power-supply circuit 30, according to the embodiment of the invention.

FIG. 4 is a diagram showing one exemplary configuration of a power-supply circuit 35, which is another example of the power-supply circuit 30, according to the present embodiment. The power-supply circuit 35 shown in the figure has a step-down output circuit 370 and a second step-down output circuit 370b, instead of the single step-down output circuit 370 shown in FIG. 2. It is noted that the components of the power-supply circuit 35 shown in the figure and denoted by the same reference numerals with the components of the power-supply circuit 30 shown in FIG. 2 have almost the same functions and configurations with those components shown in FIG. 2, so that their explanation will be omitted here, except of their differences.

The reference voltage generating section 310 of the present embodiment generates the reference voltage that is the standard of the voltage to be supplied to the DUT 15. Then, the reference voltage generating section 310 outputs the generated reference voltage to the inverted output control section 320 and the step-down output control section 350.

The inverted output control section 320 includes a voltage inverting circuit 322, a reference negative voltage generating section 324, a difference detector 326, an inverted phase correcting section 328 and an inverted on-duty deciding section 330. The voltage inverting circuit 322 outputs inverted voltage obtained by inverting the power-supply voltage received from the power supply 300 to the reference negative voltage generating section 324. Based on the reference voltage received from the reference voltage generating section 310 and the inverted voltage received from the voltage inverting circuit 322, the reference negative voltage generating section 324 generates reference negative voltage that is the standard of the negative voltage generated by the inverted output circuit 340. Then, the reference negative voltage generating section 324 outputs the generated reference negative voltage to the difference detector 326.

The inverted output circuit 340 outputs the positive voltage $V_{PP}$ and negative voltage $V_{NN}$ to each of the first and second step-down output circuits 370a and 370b while keeping the same direction in terms of the directions of the current flowing between the positive voltage terminal that outputs the positive voltage $V_{PP}$ and each of the first and second step-down output circuits 370a and 370b and of the current flowing between the negative voltage terminal that outputs the negative voltage $V_{NN}$ and each of the first and second step-down output circuit 370a and 370b to each of the first and second step-down output circuits 370a and 370b.

The step-down on-duty deciding section 360 includes a step-down triangular wave generating section 362, a first comparator 364a, a second comparator 364b, a first step-down switch control section 366a and a second step-down switch control section 366b. The step-down triangular wave generating section 362 generates a signal presenting a triangular wave having predetermined amplitude and frequency. Then, the step-down triangular wave generating section 362 outputs the generated signal to the first comparator 364a and outputs an inversion signal of the generated signal to the second comparator 364b. The first comparator 364a outputs a difference between the signal received from the step-down triangular wave generating section 362 and the signal received from the difference detector 352 to the first step-down switch control section 366a as a comparison result. The second comparator 364b outputs a difference between the inversion signal received from the step-down triangular wave generating section 362 and the signal received from the difference detector 352 to the second step-down switch control section 366b as a comparison result.

Accordingly, each of the first and second step-down switch control sections 366a and 366b receives the signal whose phase is different by 180 degrees from each other. Thereby, the first and second step-down switch control sections 366a and 366b sequentially connect each one of the second step-down switch 376a contained in the first step-down output circuit 370a and the second step-down switch 376b contained in the second step-down output circuit 370b per equal time. That is, the first and second step-down switch control sections 366a and 366b control the first and second step-down switches 374a and 376a contained in the first step-down output circuit 370a and the first and second step-down switches 374b and 376b contained in the second step-down output circuit 370b by setting the step-down on-duty as 0.5.

FIG. 5 is a chart showing a first example of temporal variations of current flowing into/out of a step-down capacitor 380 of the power-supply circuit 35 according the present embodiment. In the present embodiment, the step-down on-duty is common in each of the first and second step-down output circuits 370a and 370b and is larger than 0.5. FIG. 5a shows temporal variations of the voltage outputted from the inverted output circuit 340 to the first step-down output circuit 370a. FIG. 5b shows temporal variations of the voltage outputted from the inverted output circuit 340 to the second step-down output circuit 370b. In the present embodiment, phases of waveforms of the voltages outputted to each of the first and second step-down output circuit 370a and 370b differ from each other by 180 degrees.

FIG. 5c shows temporal variations of the currents flown respectively by the step-down inductance 372a contained in the first step-down output circuit 370a and the step-down inductance 372b contained in the second step-down output circuit 370b. FIG. 5d shows temporal variations of the current $I_C$ flowing into/out of the step-down capacitor 380. As shown in FIGS. 5a and 5b, there are sections where the second step-down switch 376a and the second step-down switch 376b are both connected and there are sections in which current increases both in the step-down inductance 372a and the step-down inductance 372b in this example. Accordingly, waveform of the current $I_C$ is not flat and the voltage to be supplied to the DUT 15 causes output ripple voltage.

FIG. 6 is a chart showing a second example of the temporal variations of the current flowing into/out of the step-down capacitor 380 of the power-supply circuit 35 of the present embodiment. In this example, step-down on-duty in each of the first and second step-down output circuits 370a and 370b is common and is almost equal to 0.5. FIG. 6a shows temporal variations of the voltage outputted from the inverted output circuit 340 to the first step-down output circuit 370a. FIG. 6b shows temporal variations of the voltage outputted from the inverted output circuit 340 to the second step-down output circuit 370b. In this example, phases of waveforms of the voltages outputted respectively to the first and second step-down output circuit 370a and 370b differ by 180 degrees from each other.

FIG. 6c shows temporal variations of the currents flown through the step-down inductance 372a contained in the first step-down output circuit 370a and the step-down inductance 372b contained in the second step-down output circuit 370b. FIG. 6d shows temporal variations of the current $I_C$ flowing into/out of the step-down capacitor 380. As shown in FIGS. 6a and 6b, there is no section where the second step-down switch 376a and the second step-down switch 376b are both connected and there is no section where the current increases both in the step-down inductance 372a and the step-down inductance 372b. Accordingly, the power-supply circuit 35 can flatten the waveform of the current $I_C$ and can almost zero the output ripple voltage of the voltage to be supplied to the DUT 15.

Next, the point of almost zeroing the output ripple voltage of the voltage to be supplied to the DUT 15 will be explained by using equations. The explanation will be made specifically on a section A shown in the figure hereinafter. In this section, variation $\Delta I_{L1}$ of the current flown through the step-down inductance 372a contained in the first step-down output circuit 370a may be expressed by using an inductance value L of the step-down inductance 372a and a switching period T of the first and second step-down switches 374 and 376, as follows:

$$\Delta I_{L1} = \frac{(V_{NN} - V_O) \times (1 - D_1)}{L} \times T \quad (12)$$

Then, in this section, variation $\Delta I_{L2}$ of the current flown through the step-down inductance 372b contained in the second step-down output circuit 370b may be expressed as follows:

$$\Delta I_{L2} = \frac{(V_{PP} - V_O) \times (1 - D_1)}{L} \times T \quad (13)$$

Then, when the step-down on-duty $D_1$ falls within a range from 0 to 0.5, a sum of $\Delta I_{L1}$ and $\Delta I_{L2}$ may be expressed as follows:

$$\Delta I_{L1} + \Delta I_{L2} = \frac{(V_{PP} - V_{NN}) \times D_1 \times |1 - 2D_1|}{L} \times T \quad (14)$$

When the step-down on-duty $D_1$ falls within a range from 0.5 to 1 on the other hand, the sum of $\Delta I_{L1}$ and $\Delta I_{L2}$ may be expressed as follows:

$$\Delta I_{L1} + \Delta I_{L2} = \frac{(V_{PP} - V_{NN}) \times (1 - D_1) \times |1 - 2D_1|}{L} \times T \quad (15)$$

Accordingly, the sum of $\Delta I_{L1}$ and $\Delta I_{L2}$, i.e., variation $\Delta I_C$ of the current flowing into/out of the step-down capacitor 380, may be expressed by the equations (14) and (15), as follows:

$$\Delta I_{L1} + \Delta I_{L2} = \quad (16)$$
$$\Delta I_C = \frac{(V_{PP} - V_{NN})}{L} \times \frac{2D_1 \times (1 - D_1) \times |1 - 2D_1|}{|1 - 2D_1| + 1} \times T$$

Here, $\Delta I_C$ must be 0 in order to zero the output ripple voltage. Accordingly, when $1 - 2 \times D_1 = 0$ holds, i.e., when $D_1$ is 0.5, the output ripple voltage is almost zeroed. It is noted that in this case, the relationship between $V_{PP}$ and $V_{NN}$ may be expressed as follows:

$$V_{NN} = -V_{PP} + 2 \times V_O \quad (17)$$

The inverted output control section 320 decides the negative voltage to be outputted out of the negative voltage terminal as shown in the equation (17) so that $D_1$ becomes 0.5 by equalizing the time during which the second step-down switch 376, contained respectively in the first and second step-down output circuits 370a and 370b, is connected with the time during which the first step-down switch 374 is connected based on the predetermined voltage $V_0$ to be supplied to the load and the power-supply voltage $V_{PP}$. More specifically, the reference negative voltage generating section 324 receives the inverted voltage of the power-supply voltage $V_{PP}$ from the voltage inverting circuit 322, receives the voltage $V_0$ to be supplied to the load from the reference voltage generating section 310 and adds voltage of twice of the voltage $V_0$ to be supplied to the load to the inverted voltage $-V_{PP}$ of the power-supply voltage $V_{PP}$ to obtain the reference negative voltage $V_{NN}$. Then, the inverted output control section 320 makes a feedback control so that the voltage of the negative voltage terminal becomes the reference negative voltage $V_{NN}$ outputted out of the reference negative voltage generating section 324.

Thereby, the power-supply circuit 35 can control the negative voltage $V_{NN}$ so that $D_1$ becomes almost 0.5 based on the inverted voltage received via the voltage inverting circuit 322 and can almost zero the output ripple voltage.

Thus, the power-supply circuit 35 of the present embodiment can almost zero the output ripple voltage by controlling the first and second step-down output circuits 370a and 370b by setting the step-down on-duty to 0.5. It can thus reduce noise that is otherwise outputted to the DUT 15.

FIG. 7 is a chart showing a third example of the temporal variations of the current flown into/out of the step-down capacitor 380 of the power-supply circuit 35 according the present embodiment. The case when the power-supply circuit 35 has the first and second step-down output circuits 370a and 370b has been explained in connection with FIGS. 4 through 6. However, the power-supply circuit 35 may have a plurality of step-down output circuits instead. In this case, the inverted output circuit 340 outputs the positive voltage and negative voltage to each of the plurality of step-down output circuits 370 while keeping the same direction in terms of the directions of current flowing between the positive voltage terminal and each of the plurality of step-down output circuits 370 and of current flowing between the negative voltage terminal and each of the plurality of step-down output circuits 370. Then, the step-down on-duty deciding section 360 includes a plurality of comparators 64 and a plurality of step-down switch control sections 366 and the step-down output control section 350 sequentially connects each of the second step-down switches 376 contained in the plurality of step-down output circuits 370 per equal time by using the plurality of step-down switch control sections 366. That is, when the power-supply circuit 35 has N step-down output circuits 370, the plurality of step-down switch control sections 366 sets step-down on-duty in each of the plurality of step-down output circuits 370 at 1/N and uses N control signals whose phases are different by (360/N) degrees each to control each of the N second step-down switches 376. In this case, the relationship between $V_{PP}$ and $V_{NN}$ may be expressed as follows:

$$V_{NN} = -(N-1) \times V_{PP} + N \times V_O \quad (18)$$

Here, a case when N is 3, i.e., when the power-supply circuit 35 has three step-down output circuits (370a, 370b and 370c), will be explained with reference to FIG. 7. In this example, the step-down on-duty in each of the step-down output circuits 370 is common and is almost equal to ⅓. FIG. 7a shows temporal variations of voltage supplied from the step-down output circuit 370a to the DUT 15. FIG. 7b shows temporal variations of voltage supplied from the step-down output circuit 370b to the DUT 15. FIG. 7c shows temporal variations of voltage supplied from the step-down output circuit 370c to the DUT 15. Phases of waveforms of the voltages supplied from the respective step-down output circuits 370 differ by 120 degrees each in this example.

FIG. 7d shows temporal variations of currents flown respectively through a step-down inductance 372a contained in the step-down output circuit 370a, a step-down inductance 372b contained in the step-down output circuit 370b and a step-down inductance 372c contained in the step-down output circuit 370c. FIG. 7e shows temporal variations of current $I_C$ flowing into/out of the step-down capacitor 380. As shown in FIGS. 7a, 7b and 7c, there is no section in which the currents increase simultaneously in the two or more step-down inductances 372 among the step-down inductance 372a, the step-down inductance 372b and the step-down inductance 372c in this example. Accordingly, the power-supply circuit 35 can flatten waveform of the current $I_C$ and can almost zero the output ripple voltage of the voltage to be supplied to the DUT 15.

That is, the inverted output control section 320 decides the negative voltage outputted out of the negative voltage terminal as shown in the equation (18) so that $D_1$ becomes 1/N by equalizing the time during which the second step-down switch 376 of the plurality of step-down output circuits 370 is disconnected with a sum of time during which the second step-down switches 376 of the step-down output circuits 370 other than the pertinent step-down output circuit 370 are connected based on the predetermined voltage $V_0$ to be supplied to the load and the power-supply voltage $V_{PP}$ in the same manner with FIG. 6. More specifically, the reference negative voltage generating section 324 receives inverted voltage of the power-supply voltage $V_{PP}$ from the voltage inverting circuit 322, receives the voltage $V_0$ to be supplied to the load from the reference voltage generating section 310 and adds voltage of N times of the voltage $V_0$ to be supplied to the load to voltage obtained by multiplying the inverted voltage $-V_{PP}$ of the power-supply voltage $V_{PP}$ by (N−1) times to obtain the reference negative voltage $V_{NN}$. Then, the inverted output control section 320 carries out a feedback control so that the voltage at the negative voltage terminal becomes the reference negative voltage $V_{NN}$ outputted out of the reference negative voltage generating section 324.

Thereby, the power-supply circuit 35 can almost zero the output ripple voltage by controlling the negative voltage $V_{NN}$ so that $D_1$ becomes almost 1/N based on the inverted voltage received via the voltage inverting circuit 322.

As described above the power-supply circuit 35 can almost zero the output ripple voltage even when the plurality of step-down output circuits 370 is used. It is thus capable of reducing noise that is otherwise outputted to the DUT 15.

It is noted that although the power-supply circuits 30 and 35 have supplied the voltage to one DUT 15 in the explanation described above, the power-supply circuits 30 and 35 may supply the voltage to a plurality of DUTs 15. In this case, the power-supply circuits 30 and 35 may have a plurality of step-down output circuits 370 that supplies voltage to loads different from each other. Then the inverted output circuit 340 may output positive voltage and negative voltage to each of the plurality of step-down output circuits 370 while keeping the same direction in terms of the directions of the current flowing between the positive voltage terminal and each of the plurality of step-down output circuits 370 and the current flowing between the negative voltage terminal and the plurality of step-down output circuits 370. It is noted that in this case, the step-down output control section 350 may control each step-down output circuit 370 by using step-down on-duty different from each other.

The power-supply circuit 30 and the power-supply circuit 35 allow the positive voltage and the negative voltage to be freely selected and be supplied to the respective DUTs 15 even when the plurality of step-down output circuits 370 for supplying voltage to the plurality of DUTs 15 is provided. Still more, because the step-down on-duty $D_1$ is not required to be synchronized with the inverted on-duty $D_2$, it is possible to supply driving voltage to each DUT 15 from one power supply 300 even when driving voltage of the DUT 15 differs per DUT 15.

Still more, although the power-supply circuits 30 and 35 have been provided within the test apparatus 10 for testing the DUT 15 in the embodiments described above, the power-supply circuits 30 and 35 may be provided within another apparatus and may supply voltage to a load other than the DUT 15.

Although the invention has been described by way of the exemplary embodiments, it should be understood that those skilled in the art might make many changes and substitutions without departing from the spirit and scope of the invention.

It is obvious from the definition of the appended claims that the embodiments with such modifications also belong to the scope of the invention.

As it is apparent from the above description, the invention can realize the power-supply circuit and the test apparatus that allow positive voltage and negative voltage to be freely selected and to be supplied to a load by using one power supply.

What is claimed is:

1. A power-supply circuit for supplying voltage to a load; comprising:
   a power supply that generates power-supply voLtage;
   an inverted outputting circuit having a positive voltage terminal for outputting positive voltage based on said power-supply voltage and a negative voltage terminal for outputting negative voltage generated based on said power-supply voltage and having different polarity from said positive voltage and outputting said positive and negative voltage while keeping the same direction in terms of the directions of electric current flowing between said positive voltage terminal and said load and of electric current flowing between said negative voltage terminal and said load; and
   a step-down output circuit for supplying predetermined voltage to said load by alternatively connecting said positive voltage terminal and said negative voltage terminal to said load with a predetermined duty ratio.

2. The power-supply circuit as set forth in claim 1, wherein said inverted outputting circuit further includes:
   an inverting inductance whose one end is connected a negative electrode of said power supply; and
   a first inverting switch provided between the other end of said inverting inductance and said negative voltage terminal.

3. The power-supply circuit as set forth in claim 2, wherein said inverted output circuit further includes a second inverting switch whose one end is connected to a line between another end of said inverting inductance and one end of said first inverting switch and whose other end is connected to a line between a positive electrode of said power supply and said positive voltage terminal; and said power-supply circuit further includes a inverted output control section for controlling said first and second inverting switches so as to disconnect said second inverting switch in connecting said first inverting switch and to connect said second inverting switch in disconnecting said first inverting switch.

4. The power-supply circuit as set forth in claim 3, wherein said inverted output control section decides inverted on-duty that is a ratio of a time during which said second inverting switch is connected to a time during which said first inverting switch is connected so as to flow feedback current from said negative voltage terminal to the outside into said inverting inductance so that said inverting inductance generates predetermined negative voltage in flowing the current from said negative voltage terminal to the outside.

5. The power-supply circuit as set forth in claim 4, wherein said step-down output circuit has
   a step-down inductance whose one end is connected to the side of said positive voltage terminal and said negative voltage terminal and whose other end is connected to the side of said load;
   a first step-down switch whose one end is connected to the side of said negative voltage terminal and whose other end is connected to a line between said positive voltage terminal and said step-down inductance; and
   a second step-down switch whose one end is connected to the side of said positive voltage terminal and whose other end is connected to a line between the other end of said first step-down switch and one end of said step-down inductance; and
   said power-supply circuit further includes
      a step-down output control section for controlling said first and second step-down switches so as to disconnect said second step-down switch in connecting said first step-down switch and to connect said second step-down switch in disconnecting said first step-down switch; and
      said inverted output control section decides said inverted on-duty that prolongs a time during which said second inverting switch is connected to be longer than a time during which said second step-down switch is connected in flowing current from said negative voltage terminal to the outside.

6. The power-supply circuit as set forth in claim 5, wherein said inverted output control section decides said inverted on-duty so as to flow the current flown into said negative voltage terminal to said inverting inductance so that said inverting inductance generates said predetermined negative voltage in flowing the current from the outside to said negative voltage terminal.

7. The power-supply circuit as set forth in claim 6, wherein said inverted output control section decides said inverted on-duty that shortens a time during which said second inverting switch is connected to be less than a time during which said second step-down switch is connected in flowing current from the outside to said negative voltage terminal.

8. The power-supply circuit as set forth in claim 7, wherein said inverted output circuit further comprises an inverted capacitor whose one end is connected to a line between a negative electrode of said power supply and one end of said inverting inductance and whose other end is connected to a line between said negative voltage terminal and the other end of said first inverting switch.

9. The power-supply circuit as set forth in claim 8, wherein said step-down output control section has a first difference detector for detecting a difference between voltage being supplied from said step-down inductance to said load and reference voltage to be supplied to said load; and a step-down on-duty deciding circuit for deciding step-down on-duty that is a ratio of a time during which said second step-down switch is connected to a time during which said step-down switch is connected so that the voltage supplied to said load becomes closer to said reference voltage based on the result detected by said first difference detector.

10. The power-supply circuit as set forth in claim 9, comprising a plurality of step-down output circuits for supplying voltage to loads different from each other, wherein said inverted output circuit outputs said positive voltage and said negative voltage to each of said plurality of step-down output circuits by keeping the same direction in terms of directions of current flowing between said positive voltage terminal and each of said plurality of step-down output circuits and of current flowing between said negative voltage terminal and each of said plurality of step-down output circuits.

11. The power-supply circuit as set forth in claim 9, further comprising first and second step-down output circuits for supplying voltage to said load, wherein said inverted output circuit outputs said positive voltage and said negative voltage to each of said first and second step-down output circuits by keeping the same direction in terms of directions of current flowing between said positive voltage terminal and each of said first and second step-down output circuits and of current flowing between said negative voltage terminal and each of said first and second step-down output circuits; said step-down output control section sequentially connects each of said second step-down switches of said first and second step-down output circuits per equal time; and said inverted output control section decides negative voltage to be outputted out of said negative voltage terminal so as to equalize a time during which said second step-down switch of said first and second step-down output circuits is connected with a time during which said first step-down switch is connected based on the predetermined voltage to be supplied to said load and said power-supply voltage.

12. The power-supply circuit as set forth in claim 9, further comprising a plurality of step-down output circuits for supplying voltage to said load, wherein said inverted output circuit outputs said positive voltage and said negative voltage to each of said plurality of step-down output circuits by keeping the same direction in terms of directions of current flowing between said positive voltage terminal and each of said plurality of step-down output circuits and of current flowing between said negative voltage terminal and each of said plurality of step-down output circuits; said step-down output control section sequentially connects each of said second step-down switches of said plurality of step-down output circuits per equal time; and said inverted output control section decides negative voltage to be outputted out of said negative voltage terminal so as to equalize a time during which said second step-down switch of each of plurality of step-down output circuits is disconnected with a sum of time during which said second step-down switches of all step-down output circuits other than the pertinent step-down output circuit are connected based on said predetermined voltage to be supplied to said load and said power-supply voltage.

13. A test apparatus for testing a device-under-test, comprising:
   a power source for generating power-supply voltage;
   an inverted output circuit having a positive voltage terminal for outputting positive voltage based on said power-supply voltage and a negative voltage terminal for outputting negative voltage that has been generated based on said power-supply voltage and whose polarity is different from said positive voltage and outputting said positive voltage and said negative voltage by keeping the same direction in terms of directions of current flowing between said positive voltage terminal and said load and of current flowing between said negative voltage terminal and said load;

a step-down output circuit for supplying predetermined voltage to said device-under-test by alternatively connecting said positive voltage terminal and said negative voltage terminal to said device-under-test with a predetermined duty ratio; and a testing section for testing said device-under-test in the state in which voltage is supplied by said step-down output circuit to said device-under-test.

14. The test apparatus as set forth in claim 13, comprising a plurality of step-down output circuits for supplying voltage to device-under-tests different from each other, wherein said inverted output circuit outputs said positive voltage and said negative voltage to said plurality of step-down output circuits by keeping the same direction in terms of directions of current flowing between said positive voltage terminal and each of said plurality of step-down output circuits and of current flowing between said negative voltage terminal and each of said plurality of step-down output circuits.

15. The test apparatus as set forth in claim 13, comprising first and second step-down output circuits for supplying voltage to said device-under-test, wherein said inverted output circuit outputs said positive voltage and said negative voltage to each of said first and second step-down output circuits by keeping the same direction in terms of directions of current flowing between said positive voltage terminal and each of said first and second step-down output circuits and of current flowing between said negative voltage terminal and each of said first and second step-down output circuits; and said step-down output control section sequentially connects each of said second step-down switches of said first and second step-down output circuits per equal time.

* * * * *